W. H. KELLY.
NUT BLANCHING MACHINE.
APPLICATION FILED AUG. 4, 1915.
1,190,555.
Patented July 11, 1916.
6 SHEETS—SHEET 4.
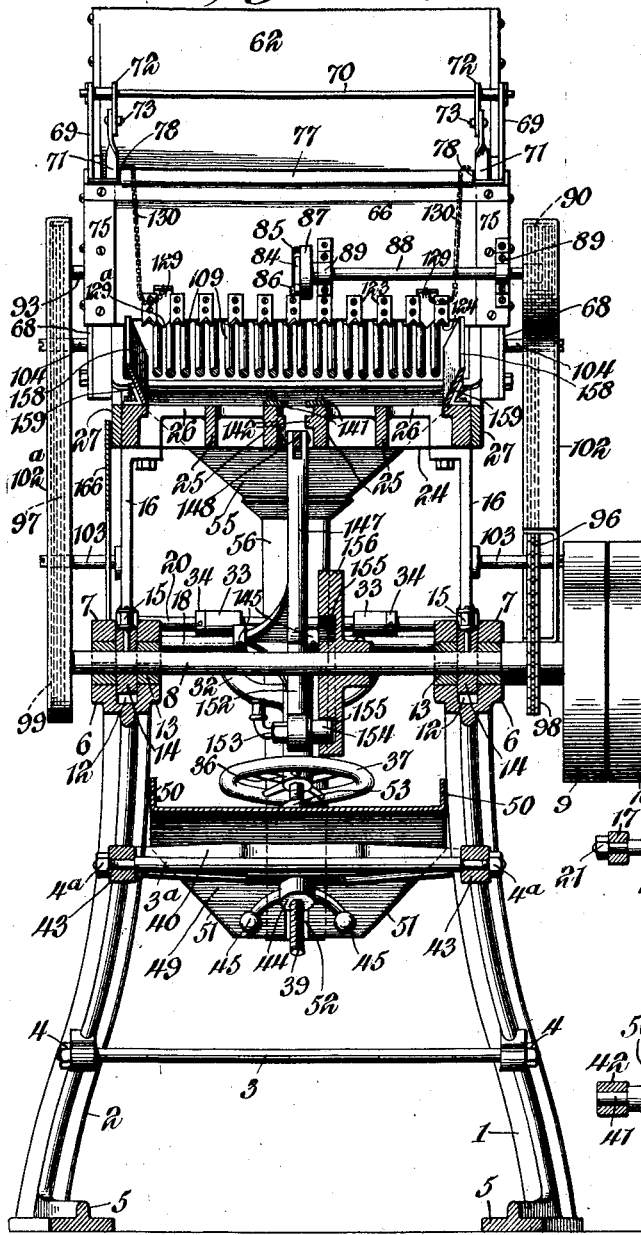
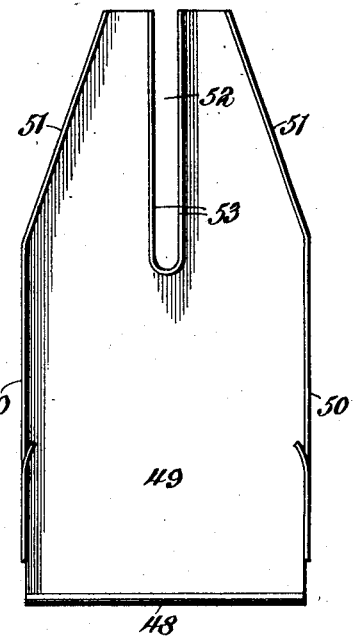
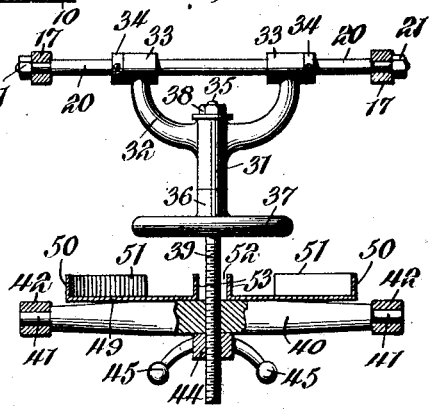
WITNESSES:
Howard D. Orr.
F. T. Chapman.
William H. Kelly, INVENTOR,
BY
Attorney W. H. KELLY.
NUT BLANCHING MACHINE.
APPLICATION FILED AUG. 4, 1915.
1,190,555.
Patented July 11, 1916.
6 SHEETS—SHEET 5.
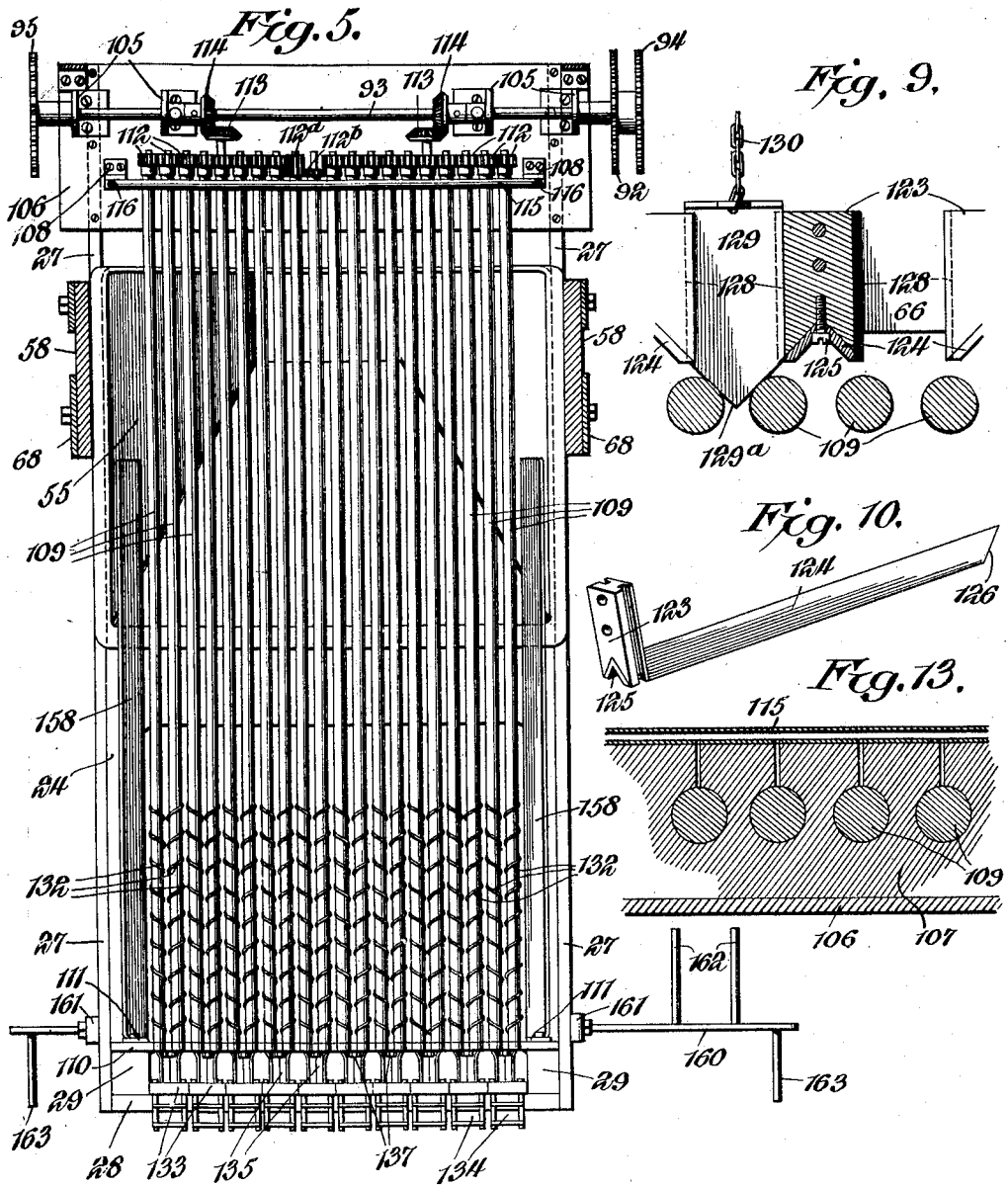
WITNESSES:
Howard D. Orr.
F. T. Chapman.
William H. Kelly, INVENTOR,
BY E. G. Siggers.
Attorney W. H. KELLY.
NUT BLANCHING MACHINE.
APPLICATION FILED AUG. 4, 1915.
1,190,555.
Patented July 11, 1916.
6 SHEETS—SHEET 6.
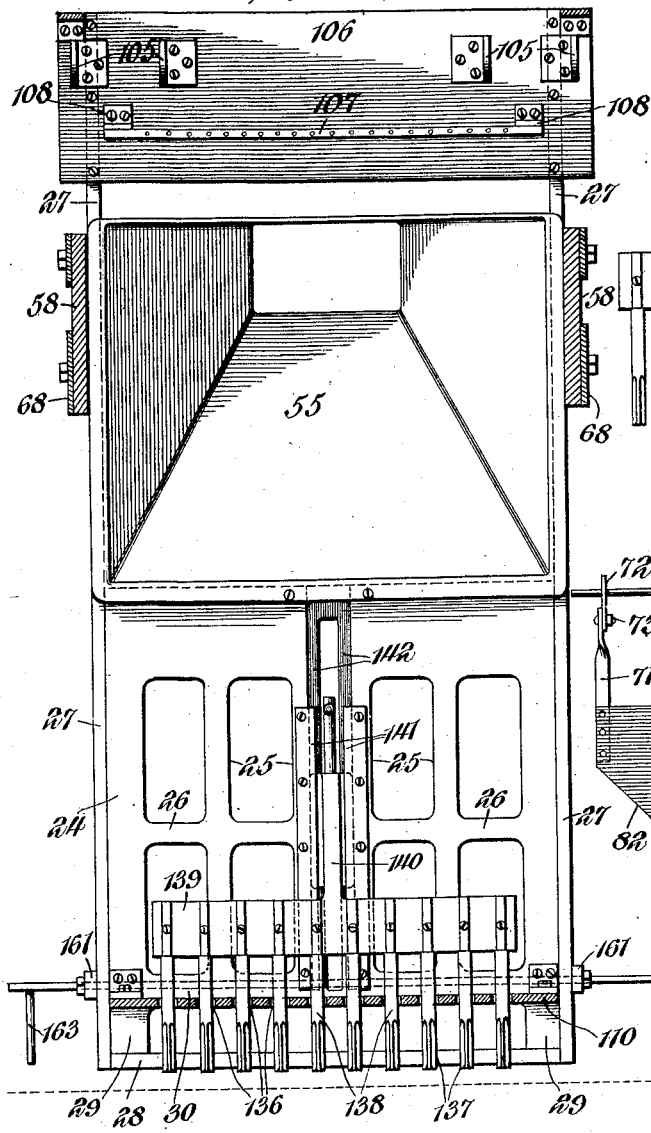
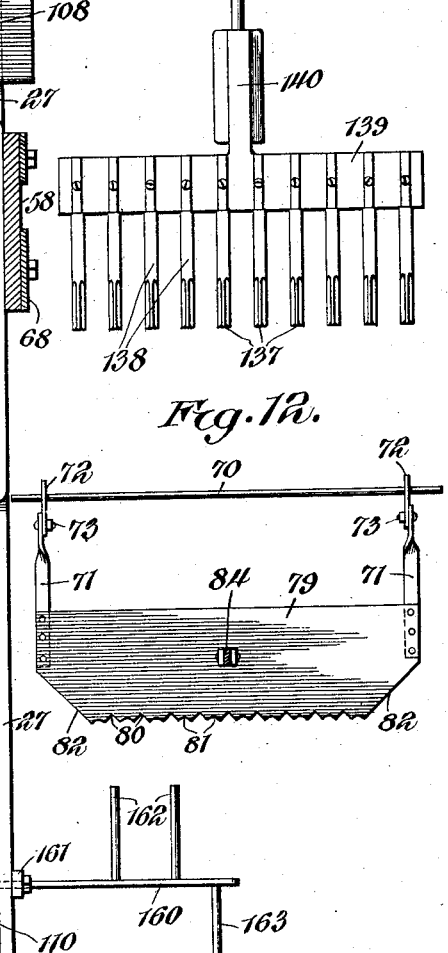
WITNESSES:
Howard D. Orr.
F. T. Chapman
William H. Kelly, INVENTOR
BY E. G. Siggers
Attorney

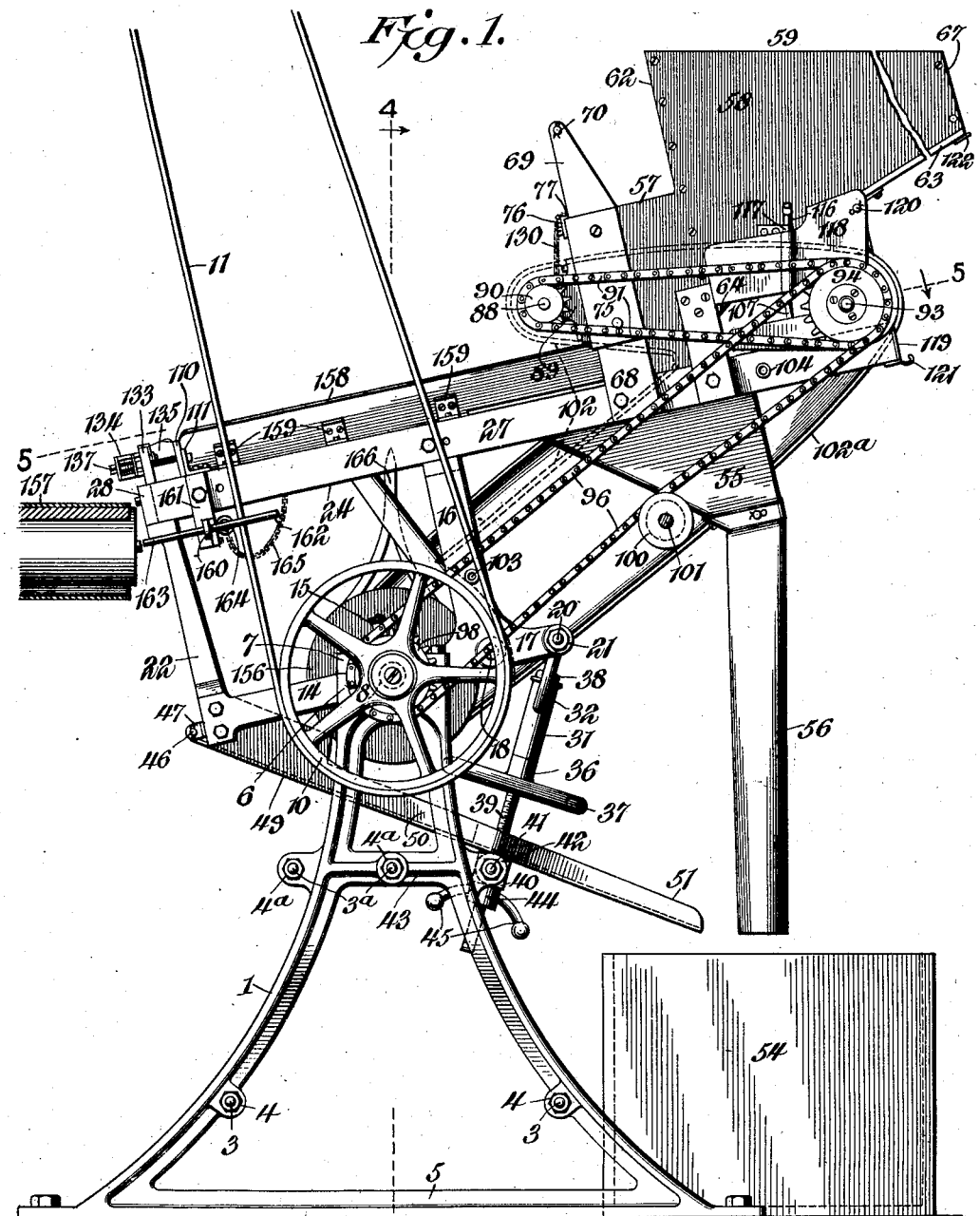

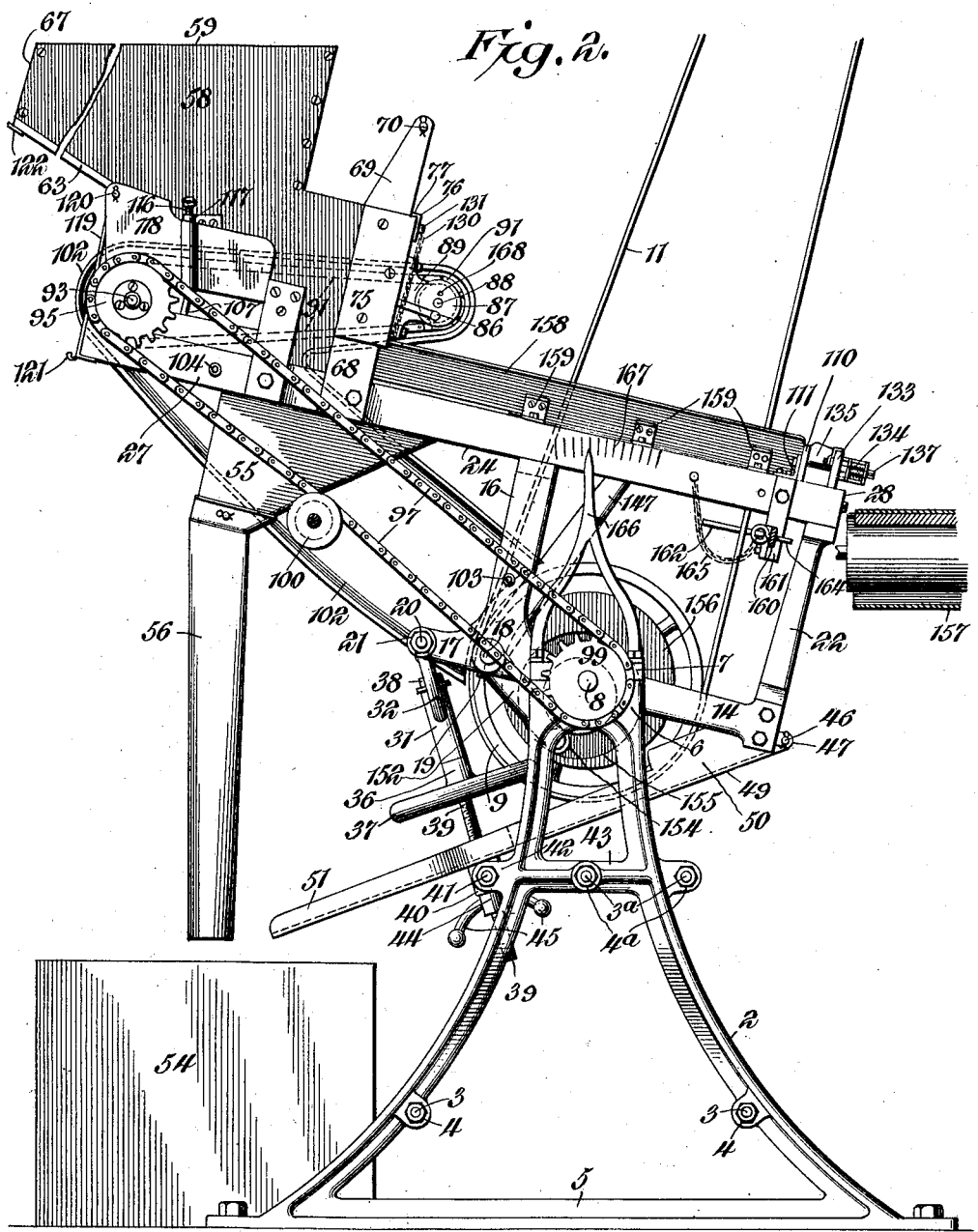

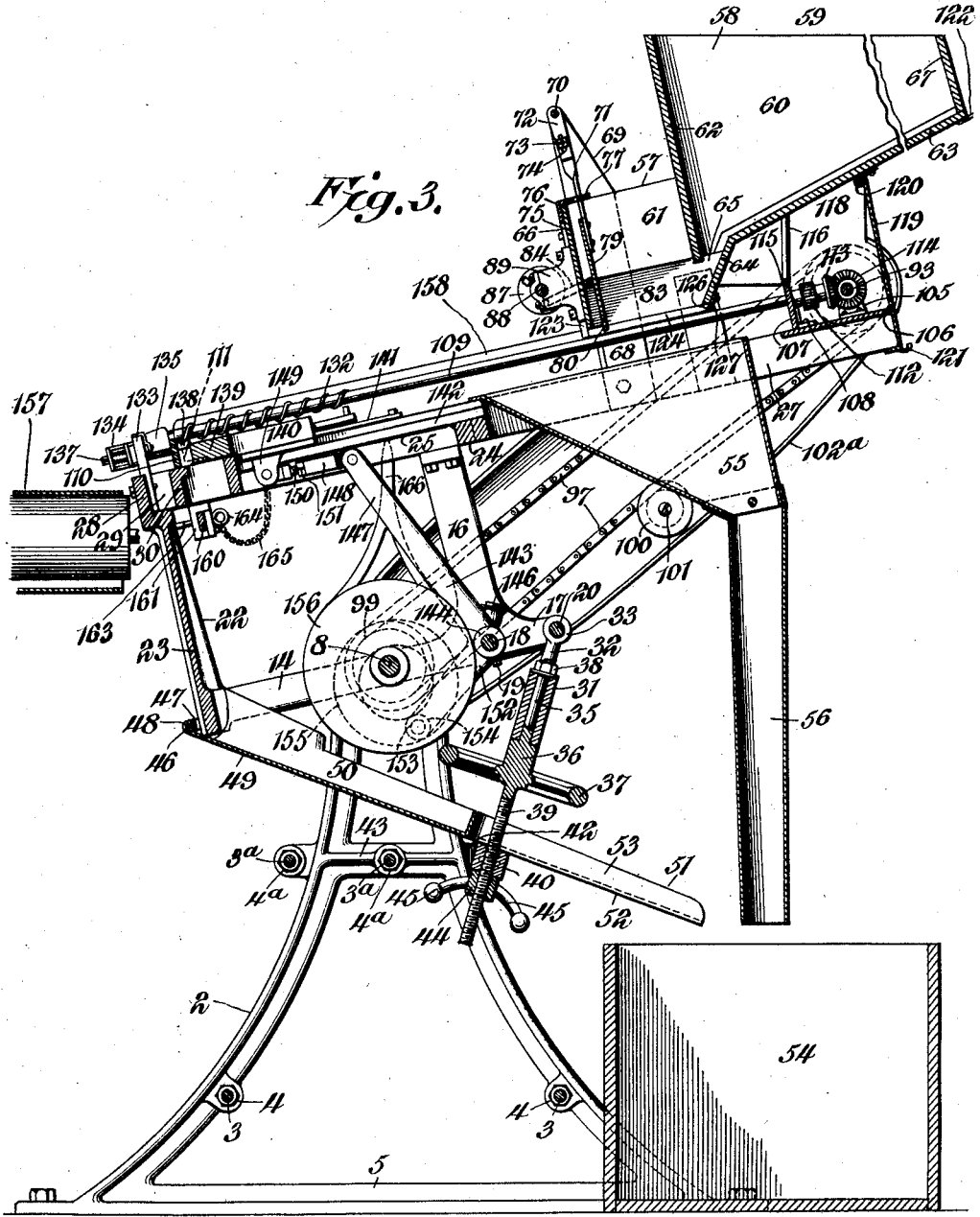

UNITED STATES PATENT OFFICE.

WILLIAM H. KELLY, OF CLEVELAND, OHIO, ASSIGNOR TO THE KELLY CO., OF CLEVELAND, OHIO, A PARTNERSHIP COMPOSED OF WILLIAM H. KELLY AND LOUIS A. KELLY.

NUT-BLANCHING MACHINE.

1,190,555.  Specification of Letters Patent.  Patented July 11, 1916.

Continuation in part of application Serial No. 865,224, filed October 6, 1914. This application filed August 4, 1915. Serial No. 43,607.

*To all whom it may concern:*

Be it known that I, WILLIAM H. KELLY, a citizen of the United States, residing at Cleveland, in the county of Cuyahoga and State of Ohio, have invented a new and useful Nut-Blanching Machine, of which the following is a specification.

This invention has reference to nut blanching machines and more particularly to the removal of the skins from the kernels of peanuts, and its object is to provide a machine capable of effectively removing the skins from roasted or otherwise cooked peanut kernels without harm to the body of the kernel and to perform such operation upon a commercial scale without causing the separation of the kernel into its component halves, which separation produces the condition known as "splits."

The present application in so far as the broader aspects of the invention are concerned is a continuation of my application No. 865,224, filed October 6, 1914, and subsequently renewed on June 15, 1915, under Serial No. 34,564. While the present application is directed to a machine differing in numerous details of construction from that shown in the aforesaid application, the same general association of the parts making up the machine is to be found in both applications. The features which are common to both applications include the orderly arrangement of hopper, feeding roller and skinning devices in the order named, and mounted as a whole to be tilted on a horizontal axis, in the installed position of the machine, for the production of gravity feed. In addition to this the feeding rollers have positive means for the separate individual feeding of the peanut kernels in tandem with the rate of feed and the action of the skinning devices so timed in relation one to the other that there is no interference during the skinning operation by a succeeding peanut reaching the skinning device ahead of time.

In general the invention comprises a suitable tiltable frame mounted on a relatively fixed support for rocking movement brought about by adjusting means between the frame and its support. At one end of the frame there is provided a hopper with an agitator therein with that part of the hopper containing the agitator divided off from the main part of the hopper, so that at no time does the agitator engage more than a small quantity of peanuts, although the main part of the hopper may contain a large body of peanuts. The frame also carries a series of spaced rolls in the form of elongated rods with one end of the series constituting the bottom portion of the compartment of the hopper containing the agitator, while the other end of the series of rolls has feeding helices separating and positively propelling the peanuts. At the last-named end of the rolls the frame carries a series of skinning devices each individual to a pair of rolls and each provided with a reciprocable plunger. Driving mechanism is provided and is so connected to the parts to be driven that each pair of feeding rolls delivers the peanuts one at a time to the skinning device belonging to the pair of rolls, but so that the peanut is delivered from the pair of rolls while the plunger is in the forward or active position, or before it has returned from such position sufficiently to permit the peanut to drop in front of it, wherefore nicety of adjustment of the parts is not needed.

The invention also includes numerous features particularly adapting it to the conditions of commercial use and which will be more specifically referred to hereinafter.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is an elevation of the machine of the present invention as seen from the driving side. Fig. 2 is an elevation of the machine as seen from the opposite side of the machine from that of Fig. 1. Fig. 3 is a central longitudinal vertical section of the machine as seen in Fig. 1. Fig. 4 is a section on the line 4—4 of Fig. 1. Fig. 5 is a section on the line 5—5 of Fig. 1 on a somewhat enlarged scale and omitting some distant parts. Fig. 6 is a plan view of the tiltable frame with some parts in section, the scale being the same as that of Fig. 5 and some distant parts being omitted. Fig. 7 is a plan view of a catch pan employed in the machine. Fig. 8 is a detail with some parts in section showing the tilting mechanism for the tiltable frame. Fig. 9 is a detail elevation with some parts in section of a fragment of the discharge end of the hopper. Fig. 10 is a perspective view of one of the V-shaped guards employed in the hopper. Fig. 11 is a plan view of the plunger carrier with the plungers thereon. Fig. 12 is an elevation with some parts in section of the agitator plate and parts associated therewith. Fig. 13 is a detail section of a portion of the upper bearing for the rolls to show the manner of lubricating the bearings of the rolls.

The present invention is directed to a machine designed to operate upon the peanut kernels after they have been removed from the inclosing shell and for convenience of description such kernels will be hereinafter called peanuts. Moreover, the machine of the present invention is designed to operate upon the peanuts after they have been cooked, such cooking being either by the operation known as roasting, or by boiling in water, or by cooking in oil, the last-named operation being termed French frying. The result of the cooking is that the peanut, which is an irregularly ovocylindrical dicotyledon with the cotyledons joined only at the radicle end and inclosed in an envelop, which for convenience will be termed the skin, is quite hard and brittle, and the brittleness is especially noticeable at the radicle. The skin is also quite brittle after cooking and is quite easily shattered. Usually the skin is nonadherent to the cotyledons, but occasionally it adheres more or less tenaciously to the cotyledons or body of the peanut, and its removal presents certain difficulties.

Machines have heretofore been proposed for the skinning of peanuts, and it is not uncommon to skin the peanuts by hand. In both cases the attempt to skin the peanuts is productive of a large portion of splits due to the very indifferent and fragile junction of the cotyledons of which the peanut kernel is composed. A very slight side pressure tending to move one cotyledon on the other either in the plane of the adjoining faces of the cotyledons or in a direction to move the cotyledons away from each other, causes a shattering of the junction at the radicle end and the consequent separation of the cotyledons. While the peanuts are not actually harmed by the separation of the kernels into the individual cotyledons there is a demand for whole peanut kernels with the skins removed, or, as they are known, whole blanched peanuts, and such peanuts are more salable than are "splits."

The showing of the drawings is that of a commercial type of machine which in actual practice meets the conditions demanded in the skinning of peanuts without producing more than a very moderate proportion of splits.

The machine comprises a supporting member made up of side frames 1, 2, joined together by rods 3 made fast to the frame by nuts 4. Each side frame has an extended base portion 5 designed to rest upon and be secured to a suitable floor in the customary manner. The legs of each side frame approach as they rise from the ends of the basic portion until at the upper end each pair of legs terminate in a pillow block 6 to which are adapted journal caps 7. Journaled in the pillow blocks 6 and held thereto by the caps 7 is a drive shaft 8 constituting the main drive shaft of the machine. This shaft extends across the frame between the pillow blocks and at the ends beyond said pillow blocks to points outside of the frame. At one end the shaft has secured thereto a tight pulley 9 and a loose pulley 10, whereby power may be applied to the shaft through a belt 11, but it will be understood that the pulleys 9 and 10 and the belt 11 are to be taken as indicative of any source of power directly or indirectly applied to the drive shaft.

Each pillow block 6 is longitudinally slotted, as shown at 12, and carries journal bushings 13 on opposite sides of the slot held in place by a cap 7, which is in reality two caps for each pillow block on opposite sides of the slot 12. Entering each slot 12 and there carried by the shaft 8 is a rock arm 14 supplied where surrounding the shaft with lubricant cups 15, which cups serve to supply the shaft where traversing the bushings 13 with a suitable quantity of lubricant. Each rock arm 14 extends on opposite sides of the shaft 8 and on one side has formed thereon a post 16 beyond which the arm is continued in the form of an extension 17. Joining the two arms 14 at a point about coincident with the posts 16 is a rod 18 fixed to the respective arms 14 by set screws 19 or in any other appropriate manner. Also joining the arms 14 at the outer ends of the extensions 17 is another rod 20 held at the extremities to the extensions 17 by nuts 21 or otherwise. The ends of the arms 14 remote from the extensions 17 are joined by a frame 22 having its interior filled by a web 23 whereby the frame is made amply strong without undue weight, and also serves as a shield.

Mounted on those portions of the posts 16 and frame 22 remote from the arms 14 is another frame 24 formed with interior bars 25 parallel with the sides of the frame 24 and with each other, and other bars 26 parallel with the ends of the frame 24. The interior of the frame 24 is of web and flange construction for lightness and strength.

Fast to the sides of the frame 24 are elongated side bars 27 joined at the ends coincident with the frame 22 by an end cross bar 28 which in the particular showing of the drawings is part of the frame 22 and is spaced from the corresponding end bar of the frame 24 by lugs 29 offstanding from the frame 24, wherefore there is provided a space between the end bar 28 and the corresponding end bar of the frame 24, which end bar is indicated at 30, for a purpose which will hereinafter appear. The side bars 27 are elongated to extend beyond the post 16 on the side thereof remote from the frame 22 for a considerable distance and are united with the frame 24 to constitute a supporting frame for numerous parts to be described, and which supporting frame is capable of being rocked about the power shaft 8 as an axis. Such power shaft in the installed position of the machine is horizontal or approximately so and therefore the tiltable frame, as it may be called, may be arranged at any desired angle to the horizontal about the axis of the shaft 8 for a purpose which will hereinafter appear. To accomplish the rocking of the tiltable frame to the desired angle there is provided a stem 31 formed into a fork 32 at one end with the legs of the fork terminating in sleeves 33 mounted on the rod 20. The sleeves 33 are free to move on the rod 20 about the longitudinal axis of the rod, but are held from movement longitudinally of the rod by set collars 34. The stem 31 is axially bored and traversed by a reduced axial extension 35 of a hub 36 carrying a hand wheel 37. The reduced portion 35 is held in the stem 31 by a nut 38 engaging one end of the stem with the hub 36 abutting the other end of the stem. On that side of the hub 36 remote from the extension 35 is another extension 39 in the form of a screw rod threaded through a rock bar 40 having pintle ends 41 journaled in ears 42 formed on the legs 1 and 2 at an appropriate distance below the upper ends of these legs and about coincident with cross-connections 43 joining the legs of each pair of legs 1 and 2. The frame is further braced at the cross junction of the legs of each pair by rods 3ª held by nuts 4.

Applied to the screw rod 39 so as to jam against the rock bar 40 is a nut 44 with ball arms 45 for its convenient manipulation. Since the connection of the screw rod to the arms 14 is to one side of the shaft 8, the arms and the frame carried thereby are easily tilted to any desired angle by a suitable manipulation of the hand wheel 37 after loosening the nut 44 and when the desired degree of tilting is accomplished the parts are firmly locked in the adjusted position by the jam nut 44.

Mounted on the frame 22 at the lower end thereof and on the face of said frame remote from the arms 14 is a pintle rod 46 held to the frame 22 by suitable brackets 47. The pintle rod carries a hinge sleeve 48 on one end of a chute pan 49. This pan is considerably elongated and has upstanding sides 50 with approaching portions 51 at the end remote from the sleeve 48, that end of the pan 49 provided with the sides 51 being narrowed toward said end. Entering the narrow end of the pan is a longitudinal slot 52 having upstanding sides 53 which, when the pan is in place, straddle the screw rod 39. The narrow end of the pan rests upon and is supported by the rock bar 40 and the arrangement is such that the pan always slants downward toward the narrow end which constitutes the discharge end of the pan. To catch any material reaching the pan 49 and gravitating therealong to the discharge end a receptacle 54 is provided to be placed underneath the discharge end of the pan or chute 49 and while this receptacle is conventionally indicated as a box, it will be understood that any suitable means of catching the material discharge from the pan or chute 49 may be provided.

Carried by the tiltable frame, and in part supported by the side bars 27 and also supported by the corresponding end of the frame 24 is a funnel 55 of appropriate size in depending relation to the frame carrying it and contracting toward the lower end where it has secured to it a spout continuation 56 of such length as to discharge into the receptacle 54, or whatever means of disposal may be provided in place of the receptacle 54.

Secured to the side bars 27 and upstanding therefrom in spaced relation to the corresponding end of the frame 24 are narrowed extensions 57 of side boards 58 of a hopper 59 divided into a main compartment 60 and a supplemental compartment 61 by a division board or wall 62, which, in the particular showing of the drawings, is about perpendicular to the plane of the tiltable frame. The hopper 59 is provided with a bottom 63 so disposed as to slant downwardly toward the division board 62, but stops short of said board and is provided with a continuation 64 having a more pronounced downward slant than the bottom 63. The lower edge of the division board 62 stops short of and is to an extent underridden by the extension 64 of the bottom 63, wherefore the hopper is provided with a contracted discharge throat 65 between the lower end of the division board 62 and the bottom extension 64. The division board 62 and the extension 64, together constitute what may be termed the rear wall of the supplemental compartment 61, while the narrowed or contracted side portions 57 of the hopper sides 58 constitute the sides of the supplemental compartment, as well as constituting supporting or carrying members for the hopper itself. The supplemental compartment is provided with what may be termed a front wall in the form of a plate 66 which may be conveniently constructed of metal, although not necessarily so, while the sides and bottom portions of the hopper, as well as the division board 62 and another board 67, constituting the rear wall of the hopper may all be composed of wood, although, of course, such parts may, if desired, be made of metal. The hopper is made fast to the side bars 27 by corner strips 68 secured to the bars 27 and rising therefrom and also secured to the side portions 57 of the hopper. The corner strips 68 have upstanding continuations 69 constituting posts or supports for a rod 70 traversing the upper ends of the supports 69 and extending from one to the other. The rod 70 carries hangers 71 each of which is provided with a separate portion 72 secured to the part 71 by a bolt 73 or otherwise extending through a slot 74 in the extension 72, whereby the effective length of the hanger may be adjusted, as desired.

Secured to each strip 68 is an angle plate 75 which also serves as a means for holding the front plate 66 of the supplemental compartment in place. The angle plates 75 carry by the ends an angle strip 76 traversing the upper portion of the plate 66 and having a web 77 overriding the upper edge of the plate 66, the web 77 being notched near the ends, as indicated at 78, to accommodate the hangers 71.

Supported at the ends by hangers 71 is an agitator plate 79 having the edge remote from the hangers, and constituting the lower edge of the agitator plate in the installed position, formed with angle notches 80 interspersed with rounded notches 81 of less depth, while the ends of the plate adjacent to the notched edge are beveled, as indicated at 82, so that the notched edge of the plate is of less length than the length of the plate itself. Where the throat 65 of the hopper 58 enters the supplemental compartment, the latter has slanting end boards 83 corresponding to the bevels 82, wherefore the bottom of the supplemental compartment is of less length transversely of the machine than the main body of the supplemental compartment.

Connected to the plate 79 at a point about midway of its height is a link 84 extending through a slot 85 in the front plate 66 of the supplemental compartment. The other end of the link is connected by a wrist pin 86 to a disk 87 on one end of a counter-shaft 88 journaled in bearings carried by brackets 89 on the corresponding face of the supplemental compartment. The shaft 88 is secured to one side of the hopper and there is provided with a sprocket wheel 90 driven by a sprocket chain 91 extending to another sprocket wheel 92, (see Fig. 5) on one end of a shaft 93 extending crosswise of the tiltable frame at a point beneath the main body of the hopper and provided at opposite ends with sprocket wheels 94, 95, respectively, exterior to the tiltable frame. The shaft 93 is driven by sprocket chains 96, 97, respectively, engaging the respective sprocket wheels 94 and 95 and in turn engaging about other sprocket wheels 98, 99, on appropriate portions of the drive shaft 8. The lower run of each sprocket chain 96 and 97 is supported by a respective idler roller 100 mounted on a pin 101 carried by a shield 102, or 102$^a$ covering the sprocket chains on the respective sides of the machine. Each shield is supported by elongated studs 103, 104 projecting from the posts 16 and the side bars 27, respectively, at appropriate points to sustain the shields. These shields are simply protective and are appropriately shaped to cover the sprocket chains.

The shaft 93 is provided at suitable points with bearings 105 mounted on a board or plate 106 carried by the corresponding ends of the side bars 27 at points beneath the bottom 63 of the hopper 58. Also carried by the board 106 is an elongated plate or strip 107 held to the board by brackets 108 or otherwise.

Extending through and journaled in the plate or strip 107 is one end of each of a series of rod-like rolls 109 in parallel relation one to the other and extending to and journaled in a plate-like strip 110 mounted on the end bar 30 of the frame 24 by brackets 111 or otherwise. The rolls 109 where projecting through the journal strip 107 carry pinions 112 each meshing with its neighbors, so that each when driven will rotate in a direction opposite to the direction of rotation of the next adjacent roll. Certain of the rolls are prolonged and each of these prolonged rolls carries a bevel pinion 113 meshing with a companion bevel pinion 114 fast to the shaft 93. In the particular showing of the drawings there are twenty rolls representing ten pairs of rolls, and at an intermediate point the intermeshing of the gears 112 is broken by the provision of a long pinion 112$^a$ and a short pinion 112$^b$, wherefore each pair of intermeshing pinions 113 and 114 drives one-half of the rolls.

In order to lubricate the bearings of the rolls 109 in the journal strip 107 there is provided a tube 115 communicating with the journals of the rods and provided at the ends with upstanding continuations 116 secured to the outer walls of the sides 59 of the hopper 58 by brackets 117, the upper ends of the tube extensions being accessible for the introduction of lubricant thereinto. To guard that portion of the structure occupied by the pinion carrying ends of the rolls 109 cover plates 118 are made fast to the sides of the hopper to close in those portions not protected by the shields 102 and 102ª, and, furthermore, there is provided a door 119 having a hinge connection 120 with the bottom of the hopper and movable into engagement with the board or plate 106 to further protect the parts. Coacting latch members 121 and 122 on the door 119 and hopper 59 are provided to hold the door in the open position when desired.

The rolls 109 are each of such diameter and these rolls are so spaced apart that a peanut cotyledon or "split" will readily pass between them, but a whole peanut kernel is usually of too great a diameter to pass between these rolls, this being true of the peanuts which the machine is designed to treat. The rolls are so disposed that the entire series underrides and forms the bottom of the supplemental compartment 61, the width of the series of rolls corresponding to the length of the compartment crosswise of the machine between the lower ends of the slanting side boards 83. The rolls 109 are so spaced apart that the points where the recesses 80 and 81 of the plate 79 meet are located immediately over the center or axial lines of the rolls.

Fast to the outer face of the plate 66 adjacent to the lower edge thereof is a series of blocks 123. These blocks are spaced apart and each block is notched at what constitutes its lower end to receive one end of a V-shaped strip 124, these strips having their webs at substantially or approximately right angles, and each strip is held at one end to a corresponding block 123 by a screw 125 or otherwise, so that the angle of the strip which is arranged uppermost is in underriding relation to the lower edge of the plate 66. Those edges of the angle strip remote from the junction of the webs are in one plane and are arranged in close relation to adjacent rolls 109 so that the upper surfaces of the angle strip are in close approach to tangential relation to the surfaces of the adjacent rolls, which rolls constitute the neighboring rolls of adjacent pairs of rolls. The angle strips 124 are of such length as to extend the full depth from front to rear of the supplemental compartment 61, and those ends of the strips 124 remote from the blocks 123 are beveled, as shown at 126, and underride the bottom extension 64 of the main compartment of the hopper, finally abutting against a retaining strip 127 at the lower edge of the said bottom continuation 64. The strips 124 act as guards extending lengthwise of the rolls 109 and are located within the supplemental compartment, so that peanuts therein are directed by these guards on to the adjacent rolls of the pairs of rolls to find their way out of the hopper beneath the plate 66 through passages defined between the lower ends of the blocks 123 where these blocks are in close relation to the rolls 109. Those edges of the blocks 123 presented toward each other have longitudinal grooves 128 therein so that a cut-off plate 129 may be introduced between any two neighboring blocks 123. One end of the plate is made V-shaped, as indicated at 129ª, so as to lodge between the rolls 109 of a pair, and thus prevent the escape of peanuts from the hopper to the particular pair of rolls thereby cut off from access of peanuts thereto. It is customary to provide two such plates each with a chain 130 made fast at some convenient point as by a screw 131 to the strip 76. The purpose of the cut-off plates 129 is to permit the continuance of the operation of the machine in case of the necessity of repairs to certain parts to be described, so that such repairs may be readily made without necessity of stopping of the machine.

Those ends of the rolls 109 adjacent to the journal strip 110 are each provided with a helical rib 132 having a pitch whereby the turns of the rib are spaced apart a distance great enough to accommodate the longest peanuts which the machine is designed to treat. Since it is only customary to produce whole blanched peanuts from the larger sizes of peanuts, the turns of the helices are ordinarily adapted to such peanuts and only such peanuts are treated by the machine as have been obtained by selection, which selection may be made by screening. That end of the series of rolls 109 where these rolls are supported by the journal plate 110 constitutes the discharge end of the series of rolls 109 and these rolls because of their function may be termed feeding rolls.

The end trip 28 carries a series of closely associated upstanding blocks 133 each supporting a skinning or decorticating structure 134 projecting from that face of the block 133 remote from the feeding rolls. In line with each decorticating device 134 is a short receptacle 135 extending between the block 133 and the journal strip 110. The receptacle 135 is designed to receive the peanuts discharged from the corresponding pair of feeding rolls 109. In line with the receptacles 135 the strip 110 is pierced by a corresponding number of passages 136 for peanut engaging ends 137 of plungers 138, which latter are of a rod-like shape and are all carried by a cross head 139 provided in ermediately with a guide block 140 movable between ways 141 on the frame 24 and between two adjacent intermediate longitudinal bars 25 of the frame 24. The intermediate bars 25 have supporting ledges 142 coacting with the ways 141 for the support and guidance of the block 140.

Mounted to rock on the rod 18 is an angle lever 143 having a hub 144 at the angle junction of the arms so that the lever may rock on the rod 18 and this lever is held against longitudinal movement on the rod by suitable set collars 145, while an oil cup 146 is provided to supply the bearings of the lever on the rod with lubricant. The lever 143 has an arm 147 terminating in the space between the intermediately located longitudinal bars 25 of the frame 24 and there the arm 147 is connected by a link 148 with ears 149 depending from the block 140. The link 148 is made longitudinally adjustable as by a screw 150 and jam nut 151, so that the throw of the plungers 138 with reference to the skinning or decorticating devices 134 may be adjusted. The lever 143 has another shorter arm 152 carrying at its end a stud 153 on which is mounted a roller 154 entering a cam groove 155 in one face of a cam disk 156 mounted on and fast to the power shaft 8. The result of this construction is that each time the power shaft makes one complete revolution the plunger head together with the plungers 138 make one complete reciprocation of an extent sufficient to carry the peanut engaging ends 137 of the plungers from a point of complete retraction so far as the cups 135 are concerned to a point where the peanut engaging ends of the plunger project through the skinning or decorticating devices 134. These decorticating devices may be such as are illustrated in the aforesaid application of which the present application is a continuation, or in application No. 860,079, of William W. Kelly, for nut blanching machine, filed September 3, 1914. However, the preferred form of skinning or decorticating devices is that generally indicated in the drawings and shown and described in detail and claimed in application of Charles F. Laganke, for peanut skinning device, filed July 9, 1915. No attempt is made to specifically illustrate or describe the skinning device last-named, and it need only be stated that such skinning device is preferred because it completely removes the skin from the peanut kernel without injury to such kernel and without breaking the cotyledons of the kernel apart, so that, considering the hopper as supplied with peanut kernels with the skins on, the machine delivers the peanut kernels with great rapidity completely denuded of the skin and with only an occasional breakage, so that the proportion of "splits" is very small. Moreover, those splits and small nuts which may be present in the batch of peanuts as delivered into the hopper are to a great extent sifted out automatically by the feeding rolls.

It is customary to install the machines in gangs with the discharge ends of the machines delivering upon a suitable conveyer, which in the drawings is only conventionally indicated at 157 without attempt at illustrating any particular form of conveyer. Of course, where a single machine is employed such conveyer is not needed, but where a comparatively large number of machines are employed they may be arranged in gangs on opposite sides of the conveyer.

In order to prevent the accidental escape of peanuts from the sides of the series of feeding rolls upstanding side plates 158 are secured to the frame 24 by brackets 159 or otherwise, and extend from the discharge end of the hopper to the discharge ends of the feeding rolls.

For convenience of control of the driving of the machine a belt shifter 160 is provided and consists of a suitable bar extending through guides 161 and provided with fingers 162 for engaging the belt. Other fingers 163 at opposite ends of the bar constitute convenient manipulating members. In order to hold the belt shifter in position and especially in the position throwing the machine out of operation, the bar 160 has suitable perforations through which a pin 164 may be passed and coming into contact with one of the guides 161 will hold the belt shifter with the belt on the loose pulley and prevent any accidental movement of the belt shifter to carry the belt on to the tight pulley. The pin 164 is supported by a chain 165 to prevent loss.

It is convenient to know the degree of inclination of the tiltable frame carrying the peanut treating devices, and hence a pointer finger 166 is mounted on one of the standards, say, the standard having the legs 2, and an index 167 is produced upon the corresponding side bar 27 in position to coact with the finger 166 to show the degree of inclination. It is also of advantage to vary the throw of the agitator blade 79 and consequently the disk 87 may have suitable sockets 168 to locate the wrist pin at different distances from the axis of the shaft 88 to vary the throw of the agitator.

Let it be assumed that a supply of peanuts sufficient, say, to about fill the hopper 59, is deposited in the compartment 60. These peanuts, which are assumed to be selected peanuts with the skins on, will at once gravitate through the throat 65 into the compartment 61, but the flow of peanuts is quickly arrested because the outflow of peanuts soon reaches the angle of rest and only a comparatively thin layer of peanuts ultimately comes into engagement with the agitator plate 79. Moreover, whatever peanuts enter the compartment 61 are localized in the bottom of the compartment and only reach those portions of the rolls 109 which constitute the facing portions of respective pairs of rolls. If, now, the driving belt be shifted on to the tight pulley, the shaft 8 is set into motion, thus through the angle lever 143 setting the plungers into reciprocatory motion. At the same time the sprocket connections with the shaft 93 causes a rotation of the rolls 109 so that those parts of each pair of rolls facing each other have a rising movement with all the rolls synchronized in speed because of the interconnections due to the pinions 112, 113 and 114. Moreover, the sprocket connection between the shafts 93 and 88 impart to the latter a more rapid rate of rotation than either the rolls or the speed of reciprocation of the plungers, the speed of the agitator being about double that of the other named parts. The agitator in moving to and fro within the supplemental compartment 61 and because of the rounded notches 81 causes a distribution of the peanuts with their long axes lengthwise of the rolls, whereupon the peanuts readily pass beneath the agitator plate 76 through the more or less rounded passages defined by the rounded notches 81 and the underlying pairs of rolls. The peanuts, however, during this operation are not pinched or tumbled about by the rotating rolls because these rolls where engaging the peanuts are always rising and at that time engaging the peanuts from opposite sides there is no tendency to roll the peanuts. Moreover, the agitator moving back and forth against but a very small quantity of peanuts at any time does not subject the peanuts to any destructive strains which might tend to move the cotyledons one on the other and so shatter the connections at the radicle ends of the kernels. The result is that the peanuts are all laid lengthwise of the pairs of feeding rolls without being subjected to any harmful pressures or other forces.

The tiltable frame of the machine is assumed to be set at a suitable angle so that the peanut kernels readily travel lengthwise of the rolls 109 under the force of gravity until they ultimately reach the feeding ribs 132. As soon as the peanuts are engaged by the ribs they are spaced one from the other by the turns of the ribs and are positively fed one at a time at a speed corresponding to the speed of rotation of the rolls irrespective of the speed of gravity feed of the peanuts along the rolls. The parts are so timed in action that each peanut is discharged from the respective pair of feeding rolls while the corresponding plunger 138 is wholly across the respective cup or receptacle 135. As the complete reciprocation of the plunger is timed to correspond with the rotation of the feeding rolls there is no change of more than one peanut at a time entering a cup for projection through the skinning or decorticating device. However, by arranging the dropping of the peanut into the cup while the plunger is within the cup, and preferably while the plunger is being projected, any nicety of adjustment is not demanded, for the plunger will be pulled back from under the peanut and the latter drop down in front of the plunger to be engaged thereby and forced through the skinning device before another peanut is dropped into the cup to be engaged by the feeding end of the plunger.

The tiltable parts of the machine are initially tilted so that the feeding of the peanuts shall be sufficiently rapid to supply the positive feeding ends of the rolls with a constant supply of peanuts, but the gravity feed is so regulated by the tilting of the tiltable parts of the machine as to prevent crowding of the peanuts toward the positive feed end of the rolls.

It is found that different batches of peanuts require different adjustments of the machine, especially different degrees of tilting of the tiltable parts, and hence on beginning the treatment of a batch of peanuts a single machine is set with its tiltable parts at such angle as the working of the machine shows to be a suitable angle. Then all the other machines are set at the same angle, and this is readily accomplished because of the presence of the indicator finger 166 and index 167. This arrangement is productive of a decided saving in time, especially where a relatively large number of machines are employed, and where the number of machines may range from ten to twenty or more. Having properly adjusted one machine the operator is assured of the proper working of the remaining machines if set according to index. The variation in tilting of the machine is not sufficient to have any harmful effect upon the action of the agitator and the feed of the peanuts from the main compartment of the hopper into the supplemental compartment. Even such variation in the mass of peanuts as may at any time reach the supplemental compartment is so small that at no time does the agitator plate 79 engage peanuts to a greater depth than two or three, and practice has demonstrated that the agitator plate does not harmfully affect so small a mass of peanuts and breakage of the peanuts by the agitator plate either does not occur at all or is so small as to be negligible.

In all batches of peanuts which have not been skinned there is a liability of some of the peanuts becoming denuded of the skin and the cotyledons broken apart so that a small proportion of splits may be found in the peanuts before being treated by the machine, but after being placed in the hopper. Such splits travel from the main compartment of the hopper into the supplemental compartment thereof and many of them find their way through the spaces between the adjacent rolls of each pair, the agitator plate acting to distribute the splits as well as the whole peanuts lengthwise of the rolls. The result is that many of the splits drop through the bottom of the supplemental compartment, which bottom is composed of the pairs of spaced rolls and such bottom being immediately over the funnel 55 the splits are directed into the receptacle 54. The funnel 55 is prolonged in the direction of travel of the peanuts beyond the discharge end of the supplemental compartment and consequently any splits which fail to escape through the grid-like bottom of the hopper find their way between the rolls after escape from the hopper. Occasionally some splits may even reach the ribbed portion of the rolls to be there discharged, but in such case the splits then drop into the chute 49 to be ultimately directed into the container 54.

The whole peanuts with the skins on are directed to the decorticating devices 134 and on being forced therethrough are wholly denuded of the skins with no material harm to the bare surfaces of the peanut kernels. This denuding takes place even though the skin be quite tenaciously adherent as sometimes happens, and the skinning of the peanut kernel also takes place from the extreme end first presented to the decorticating devices to the end last reached thereby.

It sometimes happens that with different batches of peanuts the best results are obtained by suitably adjusting the throw of the agitator blade, which is done by shifting the wrist pin 86, while in other cases it is advisable to have the lower edge of the agitator plate 79 shifted with relation to its distance from the rolls 109. This last adjustment is accomplished by means of the bolts 73 and the slotted passages 74. If it be found necessary to vary the throw of the plungers 138 so as to move to a greater or less extent through the decorticating devices 134, such variation of throw is accomplished by the adjustment provided by the threaded stem 150 and nut 151.

By the means described there is provided a commercial type of machine which in the form shown has been actually used on a commercial scale with the result that the peanuts are skinned with great speed and with a minimum production of splits far less in amount than is accomplished by hand, or by other types of machines, while the output of the machine is far in excess of any hand work, and the machine because of the large number of decorticating devices assembled in the one structure has an output in excess of other machines for a like purpose.

What is claimed is:—

1. In a peanut skinning machine, a skinning device adapted to engage and strip the skin from a peanut moving lengthwise through said device, means for propelling peanuts each lengthwise through the skinning device, and means for feeding the peanuts in the direction of their length and for controlling the same so as to be engaged one at a time by the first-named means.

2. In a peanut skinning machine, a skinning device adapted to engage and strip the skin from a peanut moving lengthwise through said device, means for propelling peanuts each lengthwise through the skinning device, means for containing peanuts and discharging them therefrom in the direction of their length, and means for receiving the peanuts discharged from the containing means and for feeding the peanuts lengthwise and for controlling the same so as to be engaged one at a time by the first-named means.

3. In a peanut skinning machine, the combination of a hopper, peanut skinning means spaced therefrom, and means between the hopper and the skinning means for feeding the peanuts lengthwise from the hopper and then controlling the peanuts so as to be engaged one at a time and be fed at intervals to the skinning means.

4. In a peanut skinning machine, peanut skinning devices, and feeding means for the peanuts having means for first arranging the peanuts longitudinally in series, and means for then automatically spacing them one from the other in the direction of their length before reaching the skinning devices.

5. In a peanut skinning machine, skinning devices, and feeding devices having means for engaging the peanuts and first arranging them in lengthwise position and causing them to travel in the lengthwise direction and also provided with automatic means for then positively directing the peanuts individually and in lengthwise direction to the skinning devices.

6. In a peanut skinning machine, skinning devices provided with means for forcing the peanuts lengthwise therethrough, and feeding means for the peanuts for operating thereon first by gravity and then positively to feed the peanuts one at a time to the means for forcing them through the skinning devices.

7. In a peanut skinning machine, skinning means, and means for feeding the peanuts toward the skinning means in longitudinal series and having automatic means for then separating the peanuts while in the same longitudinal order prior to delivering them individually to the skinning means.

8. In a peanut skinning machine, peanut skinning devices, and elongated feeding rolls arranged side by side longitudinally in pairs to feed the peanuts in longitudinal series and having coacting means to automatically separate the peanuts individually before reaching the skinning devices and to then positively direct said separated peanuts to the skinning devices.

9. In a peanut skinning machine, skinning devices, and feeding means having gravity means for arranging the peanuts lengthwise in series, and automatic means for then positively engaging the peanuts and space them apart lengthwise, the skinning devices and feeding means being timed in operation to complete the skinning operation upon each peanut before the next peanut in order is received by said skinning devices.

10. In a peanut skinning machine, peanut skinning means, and means for feeding the peanuts in longitudinal series with the peanuts arranged lengthwise, said feeding means including automatic means for engaging and separating the peanuts before reaching the skinning means and for feeding the peanuts at intervals to the skinning devices, and said skinning means and peanut spacing parts of the feeding means being timed in action to cause the intervals between the feeding of the peanuts to the skinning means to correspond to the cycle of operation of said skinning means.

11. In a peanut skinning machine, elongated feeding means, skinning devices at one end of the feeding means, and means for delivering peanuts lengthwise in series to the other end of the feeding means, said feeding means having means for automatically spacing the peanuts apart lengthwise after being received thereby and prior to reaching the skinning means, and the spacing and skinning means being timed in operation to provide intervals of feed of the peanuts to correspond to the cycle of operation of the skinning means.

12. In a peanut skinning machine, the combination of a hopper, elongated feeding rolls extending from the interior to the exterior of the hopper, and skinning devices at the ends of the rolls remote from the hopper, said hopper, feeding rolls and skinning devices being in line to operate upon the peanuts in a lengthwise direction from within the hopper to the skinning devices.

13. In a peanut skinning machine, means for containing peanuts and discharging them therefrom in the direction of their length, skinning devices spaced from the peanut containing means, means for propelling peanuts lengthwise through the skinning devices, feeding devices between the means for containing peanuts and the skinning means for carrying the peanuts in the direction of their length to the means for propelling the peanuts through the skinning devices, and driving mechanism for the feeding devices and propelling means timed to cause their operation to present a single peanut for each propelling movement of the propelling means.

14. In a peanut skinning machine, the combination of feeding means for the peanuts, skinning devices in connection with the feeding means and provided with reciprocatory plungers for forcing the peanuts through said devices, and driving mechanism for the feeding means and plungers timed to cause the operation of the feeding means with relation to the reciprocation of the plungers for placing one peanut at a time on a respective plunger for each reciprocation of the latter.

15. In a peanut skinning machine, peanut skinning means, a reciprocatory plunger for propelling the peanuts through the skinning means, and peanut feeding means timed in action to deposit the peanuts onto the plunger, one at a time, for each reciprocation of the plunger and before the plunger reaches the retracted position.

16. In a peanut skinning machine, the combination of feeding means for the peanuts having means for positively discharging one peanut at a time therefrom in a direction lengthwise of the peanut, skinning devices in communication with the feeding means and provided with reciprocatory plungers for forcing the peanuts through said devices, and driving mechanism for the feeding means and plungers timed to cause the operation of the feeding means with relation to the reciprocation of the plungers for placing one peanut at a time onto a respective plunger back of its peanut propelling end for each reciprocation of said plunger, so that accuracy of adjustment between the movements of the feeding means and plungers is not necessary.

17. In a peanut skinning machine, peanut skinning means, means for feeding the peanuts at intervals to the skinning means and having the discharge end at a higher level than the skinning means, reciprocatory plungers for propelling the peanuts through the skinning means at a lower level than the discharge end of the feeding means, and actuating means for the feeding means and plungers timed to cause the deposition of a peanut onto the plunger for each reciprocation thereof and before the plunger has reached the retracted position.

18. In a peanut skinning machine, peanut skinning means, means for feeding peanuts at intervals to the skinning means, a receptacle for peanuts between the discharge end of the feeding means and the receiving end of the skinning means, a plunger movable through the receptacle and having a range of movement to propel a peanut through the skinning means, and actuating means for the feeding means and plunger timed to deposit a peanut upon the plunger while in traversing relation with respect to the receptacle.

19. In a peanut skinning machine, a pair of feeding rolls arranged side by side and spaced apart a distance less than the diameter of the peanuts to be treated, driving means for rotating the rolls of the pair oppositely with the adjacent portions of the rolls rising in movement, means for depositing the peanuts on the rolls for progress therealong with the longitudinal axis of each peanut lengthwise of the rolls, and a skinning device at the discharge end of the pair of rolls for receiving the peanuts one by one therefrom.

20. In a peanut skinning machine, skinning devices, a series of inclined feeding rolls arranged side by side in pairs, driving means for rotating the rolls of each pair oppositely one from the other with the adjacent portions of the rolls rising in movement, means for depositing peanuts on each pair of rolls for progress therealong by the inclination and rotation of the rolls with the longitudinal axis of each peanut lengthwise of the pair of rolls, and means for preventing access of the peanuts to the spaces between the pairs of rolls.

21. In a peanut skinning machine, skinning devices, a series of inclined feeding rolls arranged side by side in pairs, driving means for rotating the rolls of each pair oppositely one from the other with the adjacent portions of the rolls rising in movement, and means for deposing peanuts on each pair of rolls for progress therealong by the inclination and rotation of the rolls, with the longitudinal axis of each peanut lengthwise of the pair of rolls carrying it.

22. In a peanut skinning machine, a pair of inclined feeding rolls arranged side by side and spaced apart a distance less than the diameter of the peanuts to be treated, driving means for rotating the rolls of the pair oppositely with the adjacent portions of the rolls rising in movement, means for depositing peanuts on the rolls for progress therealong by gravity and the rotation of the rolls with the longitudinal axis of each peanut lengthwise of the rolls, and a skinning device at the discharge end of the rolls.

23. In a peanut skinning machine, a pair of inclined feeding rolls arranged side by side and spaced apart a distance less than the diameter of the peanuts to be treated, driving means for rotating the rolls of the pair oppositely with the adjacent portions of the rolls rising in movement, means for depositing peanuts on the rolls for progress therealong by gravity and the rotation of the rolls with the longitudinal axis of each peanut lengthwise of the rolls, and a skinning device at the discharge end of the rolls, said machine also being provided with means for varying the inclination of the rolls to determine the rate of gravity feed.

24. In a peanut skinning machine, a pair of inclined feeding rolls arranged side by side and spaced apart a distance less than the diameter of the peanuts to be treated, driving means for rotating the rolls of the pair oppositely with the adjacent portions of the rolls rising in movement, means for depositing peanuts on the rolls for progress therealong by gravity and the rotation of the rolls with the longitudinal axis of each peanut lengthwise of the rolls, and a skinning device at the discharge end of the rolls, said machine also being provided with means for varying the inclination of the rolls to determine the rate of gravity feed, and the pair of rolls having coacting means for positively directing the peanuts individually to the skinning device.

25. In a peanut skinning machine, a tiltable supporting member, pairs of elongated feeding rolls thereon participating in the tilt of the supporting member, and each pair of rolls being smooth for the greater portion of its length with the lower ends provided with matching helical ribs having the turns spaced apart by peanut lengths, means for delivering peanuts in alinement to the upper ends of the rolls, and skinning means at the lower ends of the rolls.

26. In a peanut skinning machine, a series of inclined feeding rolls arranged in pairs, means for delivering peanuts in alinement to respective pairs of rolls, and skinning means provided with means for propelling peanuts therethrough, the rolls and propelling means having means for actuating them in timed relation to feed a single peanut to each skinning means for each complete movement of the propelling means.

27. In a peanut skinning machine, a series of inclined feeding rolls arranged in pairs with each pair having helical ribs at their lower ends for positively feeding peanuts and the remainder of the rolls being smooth for the gravity feed of peanuts therealong, means for delivering peanuts in alinement to respective pairs of rolls, and skinning means provided with means for propelling peanuts therethrough, the rolls and propelling means having means for actuating them in timed relation to feed a single peanut to each skinning means for each complete movement of the propelling means.

28. In a peanut skinning machine, a tiltable supporting member, pairs of elongated feeding rolls thereon participating in the tilt of the supporting member with each pair of rolls of smooth contour for a portion of its length and beyond the smooth portion having matching helical ribs with the turns spaced apart by peanut lengths, means for delivering peanuts in alinement to the upper ends of the rolls, skinning means at the lower ends of the rolls, and means for varying the degree of tilt of the supporting member to cause the gravity feed of peanuts along the pairs of rolls to the ribs without crowding.

29. In a peanut skinning machine, the combination of a hopper, devices within and extending from the hopper for feeding the peanuts lengthwise from the hopper and provided with means outside the hopper for discharging the peanuts at intervals, means in the hopper for alining the peanuts lengthwise on the feeding means, peanut skinning means at the discharge end of the feeding devices, and mans for propelling the peanuts lengthwise through the skinning means one at a time as received from the feeding means.

30. In a peanut skinning machine, the combination of a hopper, devices within and extending from the hopper for feeding the peanuts lengthwise from the hopper and provided with means outside the hopper for discharging the peanuts at intervals, means in the hopper for alining the peanuts lengthwise on the feeding means, peanut skinning means at the discharge end of the feeding devices, and means for propelling the peanuts lengthwise through the skinning means one at a time as received from the feeding means, the feeding devices being inclined to cause the gravity feed of the peanuts from the hopper toward the skinning means.

31. In a peanut skinning machine, an inclinable support, a hopper and skinning means thereon in spaced relation one from the other and located on the support so that when the latter is inclined the hopper is higher than the skinning means, and said skinning means having propelling means associated therewith for forcing the peanuts therethrough, and gravity feeding means participating in the inclination of the support and leading from the hopper to the skinning means, said feeding means being provided with positively acting means adjacent and delivering to the device associated with the skinning means for propelling peanuts therethrough, whereby the peanuts are automatically fed one at a time to the propelling means irrespective of the gravity feed.

32. In a peanut skinning machine, a hopper, a pair of inclined rolls extending from the hopper with each roll having a smooth exterior for a portion of the length from the hopper and beyond such portion provided with matching helical ribs, and skinning devices at the lower ends of the rolls and to which the pair of rolls discharges.

33. In a peanut skinning machine, a frame, a hopper, pairs of inclined rolls extending from the hopper and having a smooth exterior for a portion of their length and beyond such portion provided with helical ribs, skinning devices at the lower ends of the rolls and to which a pair of rolls discharges, a reciprocable plunger for each skinning device and movable therethrough, and driving connections for the rolls and plungers timed to cause the feeding of a peanut for each reciprocation of the corresponding plunger, the turns of each helix on the rolls being spaced apart and related to the respective roll to deliver a peanut to the respective skinning device while the plunger is in the path of the peanut deposited therein.

34. In a peanut skinning machine, a frame provided with a mounting upon which it may be rocked into tilted relation to the horizontal, a hopper for containing peanuts located at one end of the frame, skinning devices located at the other end of the frame, and gravity feeding means between the hopper and skinning devices mounted on the frame and participating in the tilting of the latter.

35. In a peanut skinning machine, a supporting member mounted for tilted relation to the horizontal, a hopper for peanuts at the high end of the supporting member in the tilted position, skinning devices at the low end of the supporting member, gravity feeding means between the hopper and skinning means, and means for varying the tilt of the supporting member at will, so as to increase or decrease the effectiveness of the feeding means.

36. In a peanut skinning machine, a basic member, a supporting member mounted thereon for movement into tilted relation to the horizontal, manually operable means between the tiltable supporting member and the basic member for varying the tilt of the supporting member at will, means at the high end of the supporting member in the tilted position for containing a supply of peanuts, skinning devices at the low end of the supporting member, and means for directing peanuts by gravity from the containing means toward the skinning devices and located on the supporting member.

37. In a peanut skinning machine, a basic member, a supporting member mounted thereon for rocking movements into tilted relation to the horizontal, a hopper for peanuts at the high end of the supporting member when tilted, skinning devices at the low end of the supporting member, pairs of elongated rolls extending from the hopper to the skinning devices for delivering peanuts from the hopper to said skinning devices, driving means located in the axis of tilt of the supporting member, and connections from the driving means to the rolls.

38. In a peanut skinning machine, a basic member, a supporting member mounted thereon for movements into tilted relation to the horizontal, connections between the basic member and the supporting member for varying the degree of tilt, actuating means located in the axis of tilt of the supporting member, a hopper for peanuts located at the high end of the supporting member when in the tilted position, skinning devices at the low end of the supporting member, reciprocatory plungers in coactive relation and individual to the skinning devices and mounted on the supporting member, rotatable rolls extending from the hopper to the skinning devices for feeding peanuts by gravity from the hopper toward the skinning devices, and driving connections from the actuating means to the rolls and plungers, respectively.

39. In a peanut skinning machine, an inclined supporting member, a hopper for peanuts located at the high end thereof, skinning devices at the low end of the supporting member, reciprocatory plungers in coactive relation and individual to the skinning devices and mounted on the supporting member, rotatable rolls for feeding peanuts by gravity from the hopper toward the skinning devices, and driving connections for the rolls and plungers, respectively, the rolls being provided adjacent the skinning devices with helical ribs for positively feeding peanuts, and the driving connections being timed in operation to cause the rotation of one complete turn of the helix to each complete reciprocation of a corresponding plunger.

40. In a peanut skinning machine, a basic member, a supporting frame mounted thereon for tilting into different relations to the horizontal, a power shaft located in the axis of tilting of the supporting frame, connections between the supporting frame and the basic member for seating the supporting frame into different tilted positions, a hopper on the frame at the high end thereof in the tilted position, gravity feeding means for the peanuts extending from the hopper toward the low end of the frame, and skinning devices at the low end of the tiltable frame.

41. In a peanut skinning machine, the combination of a hopper, pairs of feeding rolls communicating with the discharge of the hopper and each having a feeding helix thereon, skinning devices at the discharge ends of the pairs of rolls, a support mounted to tilt the rolls with respect to the horizontal for gravity feed of the peanuts from the hopper toward the feeding helices, and driving means for the rolls.

42. In a peanut skinning machine, the combination of a hopper, pairs of rolls communicating with the hopper and extending therefrom and at the ends remote from the hopper provided with helical ribs, said rolls being tilted with respect to the horizontal for gravity feed of the peanuts and the ribs having their turns spaced apart by a distance substantially equal to the length of a peanut, peanut skinning devices at the discharge ends of the rolls, plungers movable through the peanut skinning devices for propelling the peanuts therethrough, and driving means for rotating the rolls and reciprocating the plungers in timed relation to deposit the peanuts one at a time upon the plungers before the peanuts are engaged by the latter for propulsion through the skinning devices.

43. In a peanut skinning machine, a tiltable supporting frame, a hopper for peanuts located at one end of the frame and provided with a supplementary compartment, an agitator for the peanuts located in the supplementary compartment, pairs of elongated rolls constituting the bottom of the supplementary compartment and extending therefrom toward the lower end of the tiltable frame, and the pairs of rolls having helical ribs at their lower ends for positively feeding the peanuts, said rolls being elsewhere smooth, a series of skinning devices at the lower end of the frame with each skinning device in line with a pair of rolls and receiving peanuts from the discharge end thereof, a series of plungers corresponding in number to the skinning devices and individual to and movable through a respective skinning device to propel a peanut therethrough, and means for rotating the rolls, reciprocating the plungers and actuating the agitator for the gravity feed of the peanuts from the supplementary compartment along the rolls to the helical ribs and the positive feed of the peanuts by the latter to the skinning devices.

44. In a peanut skinning machine, a tiltable supporting frame, a hopper for peanuts located at one end of the frame and provided with a supplementary compartment, an agitator for the peanuts located in the supplementary compartment, pairs of elongated rolls constituting the bottom of the supplementary compartment and extending therefrom toward the lower end of the frame, the pairs of rolls at the lower ends having matching helical ribs thereon for positively feeding the peanuts and the rolls being elsewhere smooth, a series of skinning devices at the lower end of the frame with each skinning device in line with a pair of rolls to receive peanuts from the discharge end thereof, a series of plungers corresponding in number to the skinning devices with each plunger individual to and movable through a respective skinning device to propel a peanut therethrough, and means for rotating the rolls, reciprocating the plungers and actuating the agitator for the gravity feed of the peanuts from the supplementary compartment along the rolls to the helical ribs and the positive feed of the peanuts by the latter to the skinning devices, the rolls of each pair being spaced apart to permit the passage between them of smaller articles than the whole peanuts to be skinned.

45. In a peanut skinning machine, an inclined support, a hopper for containing a supply of peanuts mounted at the high end of the support and having a supplementary compartment into which the main compartment of the hopper discharges, and said hopper having means for restricting the amount of peanuts delivered at any one time into the supplementary compartment, a pendent agitator plate within the supplementary compartment having hangers adjustable as to length and provided at its lower edge with means for agitating the peanuts and determining the sizes of the outlets from the supplementary compartment, driving means for the agitator having means for varying the length of stroke of the agitator, pairs of rolls constituting the bottom of the supplementary compartment and extending therefrom in coactive relation to the agitator plate, with those ends of the rolls remote from the hopper being provided with helical ribs for the positive feed of peanuts engaged thereby, and skinning devices at the discharge ends of the pairs of rolls.

46. In a peanut skinning machine, a hopper for containing a supply of peanuts, peanut skinning means in spaced relation to the hopper, and means for conveying peanuts from the hopper to the skinning means, comprising a series of pairs of rotatable rolls, with the rolls of each pair spaced apart a distance permitting splits and small nuts to fall between the rolls and approaching close enough together to sustain whole nuts of suitable size in lengthwise position whereby the rolls act as a grader and feeder.

47. In a peanut skinning machine, a hopper for containing a supply of peanuts, peanut skinning means in spaced relation to the hopper, means for conveying peanuts from the hopper to the skinning means comprising a series of pairs of rotatable rolls, with the rolls of each pair spaced apart a distance permitting splits and small nuts to fall between the rolls and approaching close enough together to sustain whole nuts of suitable size, said rolls having means near the discharge end for spacing the peanuts apart in the direction of their length.

48. In a peanut skinning machine, a hopper for containing a supply of peanuts, peanut skinning means in spaced relation to the hopper, means for conveying peanuts from the hopper to the skinning means, comprising series of pairs of rotatable rolls entering the hopper and extending therefrom to the skinning means with the rolls of each pair spaced apart a distance permitting splits and small nuts to fall between the rolls and approaching close enough together to sustain whole nuts of suitable size, a funnel underneath the rolls where within the hopper and for a distance beyond the latter, and a chute beneath the remaining portions of the rolls and said funnel and chute having their discharge ends adjacent.

49. In a peanut skinning machine, a frame, a hopper, and means for directing peanuts therefrom mounted on the frame, skinning devices also mounted on the frame at the discharge ends of the peanut directing means, a series of plungers in coactive relation to the skinning devices, a reciprocable slide mounted on the frame and carrying the plungers, a rock lever mounted on the frame with one end connected to the slide, a cam, and connections between the other end of the lever and the cam.

50. In a peanut skinning machine, a tiltable frame, a hopper, and means for directing peanuts therefrom mounted on the frame, skinning devices also mounted on the frame at the discharge end of the peanut directing means, a series of plungers in coactive relation to the skinning devices, a reciprocatory slide mounted on the frame and carrying the plungers, a rock lever mounted on the frame with one end connected to the slide, a cam mounted in the axis of tilting of the frame, and connections between the other end of the lever and the cam, whereby tilting of the frame has no effect upon the throw of the slide.

51. In a peanut skinning machine, a tiltable frame, a hopper and peanut feeding means leading therefrom and mounted on the frame, skinning devices also mounted on the frame at the discharge end of the peanut feeding means, a connected series of reciprocable plungers in coöperative relation to the skinning devices, and actuating means for the plungers in part located in the axis of tilting of the frame and in part carried to one side thereof, whereby variation in the degree of tilt of the frame does not affect the extent of reciprocation of the plungers.

52. In a peanut skinning machine, an inclined frame, a hopper carried by the frame at the high end thereof and having an overhang at said high end, a laterally extended series of elongated pairs of rolls underlying the hopper and extending beneath the overhang thereof and also extending to the low end of the frame and at both ends provided with journal bearings, skinning devices through which the rolls discharge peanuts received from the hopper, intermeshing gears at the high ends of the rolls, and driving means for the gears for imparting simultaneous movement to the rolls with the rolls of each pair rotating oppositely.

53. In a peanut skinning machine, an inclined frame, a hopper at the high end of the frame, a laterally extended series of elongated pairs of rolls underlying the hopper and extending to the low end of the frame and provided with journal bearings at both ends, skinning devices on which the rolls discharge peanuts received from the hopper, intermeshing gears at the high ends of the rolls, driving means for the gears for imparting simultaneous movement to the rolls with those of each pair rotating oppositely and the series of rolls being divided into two sets, a common drive shaft for the rolls, gearing connections between the spaced points of the shaft and the respective sets of connected rolls, and driving means connected to opposite ends of the shaft.

54. In a peanut skinning machine, a tiltable supporting member, means for setting the supporting member into different degrees of tilted relation to the horizontal, means on the supporting member for holding a supply of peanuts, peanut skinning means on the supporting member spaced from the supply holding means, peanut feeding means on the supporting member for directing peanuts from the supply holding means to the skinning means, and means for indicating the tilt of the supporting member, whereby a gang of machines may be quickly set to proper position after such position is ascertained from the adjustment of one machine.

55. In a peanut skinning machine, an inclined support, a hopper for containing a supply of peanuts, an agitator therein controlling the discharge end of the support and provided with means for varying the size of the discharge outlets, pairs of rotatable rolls constituting the bottom of the portion of the hopper provided with the agitator and extending therefrom, and skinning devices on the support at the discharge ends of the pairs of rolls.

56. In a peanut skinning machine, an inclined frame, a hopper at one end thereof, pairs of rotatable rolls extending into the hopper and leading therefrom, skinning devices at the ends of the rolls remote from the hopper, an agitator within the hopper, guards within the hopper for bridging spaces between adjacent pairs of rolls, blocks exterior to the hopper and each carrying one of the guards, and removable gates adapted to the blocks for closing the portions of the outlets from the hopper defined by the blocks.

57. In a peanut skinning machine, an inclined frame, a hopper at one end thereof, pairs of rotatable rolls extending into the hopper and leading therefrom, skinning devices at the ends of the rolls remote from the hopper, an agitator within the hopper, guards within the hopper for bridging spaces between adjacent pairs of rolls, blocks exterior to the hopper and each carrying one of the guards, and plates adapted to the blocks and each comprising a gate with one end shaped to lodge between adjacent rolls of a pair of rolls.

In testimony, that I claim the foregoing as my own, I have hereto affixed my signature.

WILLIAM H. KELLY.